US005871684A

United States Patent [19]
Teng et al.

[11] Patent Number: 5,871,684
[45] Date of Patent: Feb. 16, 1999

[54] METHOD OF MAKING LIGHTWEIGHT, LOW THERMAL EXPANSION MICROWAVE STRUCTURES

[75] Inventors: Tzu Guu Teng; Boon Wong, both of Torrance, Calif.

[73] Assignee: Hughes Electronics Corporation, Los Angeles, Calif.

[21] Appl. No.: 896,103

[22] Filed: Jul. 17, 1997

[51] Int. Cl.$^6$ ............................ C04B 35/624; B05D 5/12

[52] U.S. Cl. .......................... 264/614; 264/619; 264/621; 427/96; 427/123; 427/125

[58] Field of Search .................................... 264/614, 619, 264/621; 427/58, 96, 123, 125

[56] References Cited

U.S. PATENT DOCUMENTS 4,344,062 8/1982 Sudoh et al. .............................. 338/35

OTHER PUBLICATIONS

Abstract of Japanese Application No. JP 01206562. 1991.
Sol–Gel Processing and Applications by Attia, pp.3,363,366. 1994.

*Primary Examiner*—Christropher A. Fiorilla
*Attorney, Agent, or Firm*—Terje Gudmestad; Georgann S. Grunebach; Michael W. Sales

[57] ABSTRACT

A method of making a lightweight, microwave electronic structure includes the steps of forming a rigid, glass structure having a desired density by a sol-gel process and thereafter uniformly coating the formed glass structure with an adherent and uniform conductor. The sol-gel process may be carried out by polymerizing a mixture comprising silicon alkoxide, water and an alcohol. The coating process may be carried out by coating the glass structure with a solution comprising an organic compound of a metal dissolved in an organic solvent and thereafter volatizing the organic solvent.

14 Claims, 1 Drawing Sheet

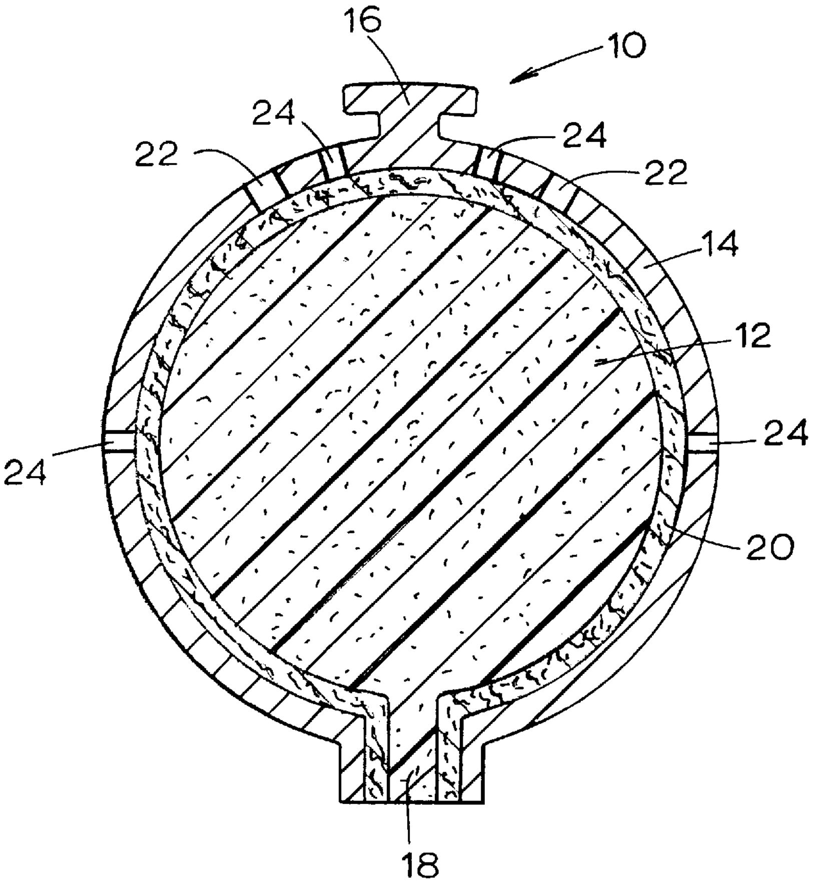
16
10
24
22
24
22
14
12
24
24
20
18

METHOD OF MAKING LIGHTWEIGHT, LOW THERMAL EXPANSION MICROWAVE STRUCTURES

BACKGROUND OF THE INVENTION

1. Field of the Invention

The invention relates generally to lightweight microwave structures and, more particularly, to lightweight microwave structures having excellent thermomechanical stability, and a method of making the same.

2. Brief Description of the Related Art

Due to a desire to minimize payload weight, and thereby reduce costs, it is preferable to use lightweight components whenever possible in the construction of high-power communications satellites. Furthermore, due to the extreme operating conditions (e.g., wide temperature fluctuations) of satellites and the components thereof, it is desirable to make and use components capable of enduring these operating conditions without detrimentally affecting their performance capabilities.

For example, one component used in communications satellites is a microwave resonator, which is a tuned, electromagnetic circuit that transmits energy at or near a resonant frequency. It can be used as a filter to remove electromagnetic signals of unwanted frequencies from input signals and to output signals having a preselected bandwidth centered about one or more resonant frequencies. Typical shapes used for such resonators include cylinders, rectangular bodies, and spheres. Side walls of a cavity defined by the resonator act as a boundary that confines the electromagnetic wave to the enclosed cavity. The frequency of the resonator is a function of the cavity dimensions. Accordingly, a change in temperature can cause the effective dimensions of the cavity to change by expansion or contraction of the resonator material which, in turn, causes the resonant frequency to change.

Microwave electronic components, such as microwave resonators, used in high-power communications satellites have been composed primarily of either conductive metal-plated aluminum or a conductive metal-plated iron-nickel Invar™ alloy (hereafter "Invar™"). Incorporation of conductive metal-plated aluminum or Invar™ into microwave electronic components, such as microwave resonators, has proven particularly troublesome because of their poor thermomechanical stability and/or their high weight.

Microwave electronic components, such as microwave resonators, are often made of aluminum due to its low specific gravity of about 2.7. However, aluminum exhibits poor thermal expansion resistance (i.e., a high coefficient of thermal expansion of about 20 ppm/°C.). Thus, microwave electronic components made of aluminum exhibit poor thermomechanical stability and frequently must be tuned to maintain their resonant frequencies. A temperature compensation membrane, such as the one disclosed in U.S. Pat. No. 4,677,403, may be used to minimize the amount of tuning required to maintain the resonant frequency of an aluminum-based microwave electronic structure in spite of temperature-induced dimensional changes in the aluminum. The use of these membranes, however, results in decreased production efficiency and an increase in manufacturing costs. Furthermore, the added hardware required to tune the microwave electronic structure adds to the weight of the high-power communications satellite.

Invar™, an alternative to aluminum, exhibits a higher resistance to thermal expansion (i.e., a low coefficient of thermal expansion of about 1 ppm/°C.). However, Invar™ is more dense (having a specific gravity of about 8.0) than aluminum, and therefore is undesirable for use in lightweight satellites.

It would be desirable to provide a lightweight microwave electronic structure, and a method for making the same, wherein the structure, and the material comprising the structure, exhibit thermomechanical stability, chemical durability, mechanical integrity, thermal shock resistance, and tailorable dielectric behavior suitable for use in lightweight spacecraft.

SUMMARY OF THE INVENTION

It is an object of the invention to overcome one or more of the problems described above.

Accordingly, the invention provides a method of fabricating a lightweight microwave structure exhibiting excellent thermomechanical properties, thereby eliminating any need for a temperature compensation membrane.

One aspect of the invention is a method for making a microwave structure, including the sequential steps of forming a silica gel by a sol-gel molding process, sintering the gel at an elevated temperature sufficiently high to form a microporous or fully dense silica glass structure, and subsequently coating the surface(s) of the glass structure with a conductor.

Another aspect of the invention is a microwave electronic structure made by a method comprising the sequential steps of forming a silica gel by a sol-gel molding process, sintering the gel at an elevated temperature sufficiently high to form a microporous or fully dense silica glass structure, and subsequently coating the surface(s) of the glass structure with a conductor.

Another aspect of the invention is a microwave electronic structure comprising a microporous silica glass structure coated with a conductor, wherein the glass structure has a desired density.

Another aspect of the invention is an apparatus for making a spherical, hollow microwave electronic structure having a continuous, seamless, and conductive internal surface. The apparatus comprises a spherical outer shell and a spherical inner portion disposed therein, wherein the outer shell includes an opening for removing the inner portion from the outer shell.

Other objects and advantages of the invention may become apparent to those skilled in the art from a review of the following detailed description taken in conjunction with the drawing and appended claims.

BRIEF DESCRIPTION OF THE DRAWING

The sole FIGURE illustrates a cross-sectional view of a spherically-shaped mold apparatus for use in preparing a spherical microwave electronic structure having a continuous, seamless, and conductive internal surface.

DETAILED DESCRIPTION OF THE INVENTION

A method of making a microwave electronic structure according to the invention includes the sequential steps of forming a silica gel by a sol-gel molding process, sintering the gel at an elevated temperature sufficiently high to form a microporous or fully dense silica glass structure, and coating the surface(s) of the glass structure with a conductor. The microwave electronic structure made by the inventive method comprises a silica glass structure coated with a conductor.

An inorganic silica polymer, such as a silica glass structure, is prepared by a solution-gelation (hereafter "sol-gel") process during which hydrolysis, followed by condensation polymerization, of a silicon alkoxide, such as tetraethylorthosilicate (hereafter "TEOS"), takes place in the presence of water and an alcohol. This two-step reaction process, which transforms a miscible one-phase liquid solution into a two-phase material, is called "sol-gel transition." Generally, the TEOS/water/alcohol mixture is slow to hydrolyze. However, the hydrolysis rate is a function of the solution pH and, therefore, may be controlled by the addition of an acid or base as a catalyst.

Solution pH also influences the properties of the formed silica polymer gel. Polymerization in an alkaline solution yields a polymer gel that is relatively porous and translucent, and further characterized by clusters of $SiO_2$ that are linked together to form the gel. Polymerization in an acidic solution, on the other hand, yields a transparent polymer gel that is characterized by a very fine porosity (i.e., is microporous) and by uniform, linear molecules that coalesce during subsequent sintering to form a high-density (fully dense) material at relatively low temperatures (e.g., about 800° C.).

The polymer gel formed by the sol-gel process is a two-phase material, denoted "alcogel," one phase of which contains a solid siloxane skeletal network (i.e., $(\text{—Si—O—Si—})_n$), and an aqueous phase containing water and alcohol in the pores. Once the alcogel is formed, it is dried by slowly heating the gel to vaporize the volatile species, such as alcohol. Drying of the alcogel should occur slowly, because rapid drying may result in non-uniform gel shrinkage, which may then cause cracking in a subsequently dried alcogel (a xerogel). Cracking is especially noticeable in gels having a high liquid content in small pores. In this case, if drying occurs too rapidly, the small pores will not be able to accommodate the expulsion of liquid quickly enough, thereby causing cracks in the resulting xerogel.

By properly driving off the volatile species by natural evaporation, the formed polymer gel comprises a two-phase, rigid xerogel (a gel containing an oxide skeleton and micropores). The number and size of the pores found in the final glass product (and, thus, the density of the final glass product) are a function of the rate of heating, the ultimate sintering temperature, and the period of time the xerogel is maintained at the ultimate sintering temperature. The ultimate sintering temperature is reached by heating the xerogel at a heating rate of about 0.5° C. per minute to about 5.0° C. per minute. Generally, the gel is sintered at an elevated temperature sufficiently high to form a microporous or fully dense silica glass structure. ("Microporous" means the sintered structure contains residual pores having dimensions smaller than about three micrometers. "Fully dense" means the density of the sintered body reaches the theoretical density of silica glass.) Preferably, temperatures of about 800° C. to about 1025° C., or a temperature above the glass transition temperature of the chemically equivalent melted glass (e.g., silica), are suitable for sintering according to the inventive method. (The gel should not be sintered, however, at temperatures that would result in the formation of a macroporous silica glass structure, i.e., pore diameter sizes of three micrometers or greater.) The gel is maintained at this ultimate sintering temperature for about 0.5 hours to about eight hours. By sintering the gel according to the inventive process a glass having properties similar to those of conventional melt-formed glass is achieved.

According to the invention, one skilled in the art can adjust the sintering conditions (heating rate, ultimate sintering temperature, and time) to produce a structure having a desired density. Based on the heating rate ranges disclosed above, a high heating rate will result in a less dense structure having a large number of large pores. Conversely, a low heating rate will result in a more dense structure having a small number of pores. Further, the higher the ultimate sintering temperature, the higher the density of the resultant structure, assuming the heating rate and time that the structure is at the ultimate sintering temperature are constant. Still further, the longer the structure is maintained at the ultimate sintering temperature, the more dense the resultant structure assuming the heating rate and ultimate sintering temperature are constant.

It is known in the art that the dielectric constant of a microwave electronic structure is related to its density. Thus, by controlling the density of the structure, it is possible to control the dielectric constant of the structure.

In accordance with the inventive method, a homogeneous silicon alkoxide solution is prepared by mixing a silicon alkoxide, such as TEOS, an alcohol, such as ethanol, and water in proportions and at a pH that results in a miscible solution. Under conditions of room temperature, at one atmosphere, equal volumes of ethanol and TEOS permit dissolution of water for hydrolysis (for example, 43 volume % TEOS, 43 volume % ethanol, and 14 volume % water). The homogeneous solution is then cast or injected into a mold cavity formed by a mold wherein the solution substantially fills and occupies the cavity. In the mold cavity, the solution is allowed to polymerize to form a gel, by maintaining the solution temperature at about 20° C. to about 40° C. until the solution has formed an alcogel.

After the gel is formed, it is dried at room temperature or at a temperature up to 70° C. where the body can shrink uniformly. This drying may require a time period ranging from hours to days, depending on the dimensions of the piece. After drying, the xerogel is then sintered by heating to a temperature of about 800° C. to about 1025° C. at a heating rate of about 0.5° C. per minute to about 5.0° C. per minute, or at a rate that is slow enough to result in a uniformly dense glass structure and to prevent gas entrapment within shrinking pores. The gel is thereafter maintained at a temperature of about 800° C. to about 1025° C. for about 0.5 hours to about eight hours, or until a desired density of the glass structure is achieved. By sintering the gel according to the foregoing conditions, the gel forms a rigid, thin-wall silica glass with a desired density. The formed glass is lightweight (e.g., having a specific gravity of about 2.2 or less) and exhibits excellent thermomechanical stability (e.g., a coefficient of thermal expansion of about 0.6 ppm/°C.).

Suitable silicon alkoxides for use according to the invention include tetraethylorthosilicate, and tetramethylorthosilicate (TMOS). It is preferable to use TEOS as the silicon alkoxide.

Suitable alcohols for use according to the invention include methanol, ethanol, butanol, and pentanol. It is preferable to use ethanol and/or methanol, and it is most preferable to use ethanol.

After formation of the glass structure, the glass is coated with a metal selected from the group consisting of silver, gold, copper, and mixtures thereof. An organic compound of the metal (organometallic compound), such as silver resinate, is used to coat the glass structure. Any method of applying the organometallic coating to the glass structure can be employed, however it is preferable that the organometallic coating be sprayed, or brushed on the glass structure. Alternatively, the glass structure may be dipped into a bath of the organometallic coating material. Depending on the method of coating the glass structure, the organometallic coating may be dissolved in an organic solvent, such as xylene, to adjust the viscosity and concentration of the coating. Other organic solvents suitable for adjusting the viscosity and concentration of the organometallic coating material include toluene, cyclohexane, and dipentene.

Once the glass structure has been coated with the solution, the coating and glass structure are heated, thereby volatilizing the organic solvent. The coated glass structure is typically heated and calcined at a temperature of about 125° C. to about 175° C. in air for about 10 minutes to about 15 minutes, or until substantially all of the organic solvent has been volatilized (burned out). Thereafter, the coated glass structure is gradually heated to a temperature of about 500° C. to about 875° C., for about 10 minutes to about 15 minutes, or to a temperature where the organometallic coating completely decomposes within a reasonable time period. By these heating steps, the organometallic coating decomposes, for example into elemental silver and gases (i.e., carbon monoxide, carbon dioxide, etc.). The gases will leave the system whereas the elemental silver will retain and adhere to the glass surface.

The coating and drying process described above forms a conformal, conductive coating on the glass structure, resulting in a microwave electronic glass structure having a dense, uniform, smooth, and conductive surface.

The shape and size of the mold into which the silicon alkoxide solution is cast or injected may be varied according to the desired shape and size of the final product. For example, cylindrically-shaped microwave structures can be formed by injecting the solution into a cylindrically-shaped mold cavity. If desired, top plates to cap the cylinder may be fabricated separately by casting the solution in appropriately shaped mold cavities. Thereafter, the top plates may be brazed or soldered to the cylindrical shaped structure and the entire structure may be coated with a conductor to form a closed cylindrically-shaped microwave structure having a continuous, conductive internal surface.

According to the invention, it is also possible to fabricate spherical microwave structures of a size and quality not possible with prior art processes and materials. In particular, it is possible to fabricate spherical microwave structures having a continuous, seamless, and conductive internal surface. Such a spherical microwave structure would not require the use of a temperature compensation membrane.

Referring to the figure, a spherical microwave structure is fabricated by injecting a homogeneous silicon alkoxide solution, as described above, into a spherically-shaped mold apparatus, generally designated 10. The mold apparatus 10 comprises an inner part 12 and an outer shell 14. The outer shell 14 is a rigid material suitable for repeated use in the fabrication of microwave structures. Preferably, the outer shell 14 is constructed of a stainless steel. Furthermore, the outer shell 14 including of two half-spherical shells which are fastened together by a fastener 16 to form a hollow sphere. The inner part 12 is formed of a material that may be dissolved or melted once fabrication of a rigid structure is complete and is removed from the outer shell 14 through an aperture 18 found therein. Alternatively, the inner part 12 may be an inflatable balloon which can be deflated and removed or dissolved through the aperture 18 once fabrication of the rigid structure is complete. Preferably, the inner part is formed of a wax or a plastic material.

With continued reference to the drawing, a silica glass fabric material 20 occupies a cavity formed by the outer shell 14 and the inner part 12 and is positioned to substantially cover or envelope the inner part 12. The glass fabric material 20 substantially resembles a cloth of woven glass fibers. The silica glass fabric material 20 is selected based on the desired thickness of the microwave electronic structure to be fabricated and also based on the coefficient of thermal expansion of the microwave electronic structure. The glass fabric material 20 acts as a skeleton about which the silicon alkoxide solution will polymerize. Thus, the glass fabric material 20 becomes a part of (and adds structural integrity to) the formed microwave electronic structure.

The homogeneous silicon alkoxide solution may be injected into the mold cavity of the mold apparatus 10 through injection holes 22 of the outer shell 14. An amount of homogeneous silicon alkoxide solution is injected such that it saturates the glass fabric material 20 and expels any air within the glass fabric material 20 and mold cavity through vent holes 24 in the outer shell 14. The venting process may be operated in a vacuum environment, such as inside a vacuum bell-jar. The injected solution is polymerized to form an alcogel as described above. The alcogel is then dried to form a xerogel. Upon formation of the xerogel, the outer shell 14 and inner part 12 may be removed leaving a spherically-shaped, hollow xerogel structure. The xerogel structure is then sintered to a desired density according to the process described above to form a glass structure having the desired density. Finally, the formed glass structure is coated with a conductor to form the spherical microwave structure having a continuous, seamless, and conductive internal microwave surface.

By the foregoing process of the invention it is possible to make a lightweight microwave structure exhibiting excellent thermomechanical properties, thereby eliminating any need for a temperature compensation membrane. Microwave structures made according to the invention can be used in various applications within lightweight spacecraft, such as filters, resonators, and in other applications demanding excellent thermomechanical properties.

The foregoing description is provided for clearness of understanding only, and no unnecessary limitations should be understood therefrom, as modifications within the scope of the invention will be apparent to those skilled in the art.

What is claimed is:

1. A method of fabricating a microwave electronic structure, said method comprising the sequential steps of:

(a) creating a silica gel by a sol-gel process;

(b) sintering said gel at an elevated temperature sufficiently high to form a microporous or fully dense silica glass structure;

(c) coating said glass structure with a solution comprising an organic compound of a metal selected from the group consisting of silver, gold, copper, and mixtures thereof dissolved in an organic solvent; and (d) volatizing said organic solvent to provide an electrically conductive coating on said glass structure.

2. The method of claim 1, wherein said gel is sintered at a temperature of about 800° C. to about 1025° C.

3. The method of claim 1, wherein the sintering temperature is reached by increasing the temperature of the gel of step (a) at a rate of about 0.5° C./minute to about 5.0° C./minute.

4. The method of claim 1, wherein said organic solvent is selected from the group consisting of xylene, toluene, cyclohexane, and dipentene.

5. The method of claim 1, wherein said silica gel is formed by polymerization of a mixture comprising a silicon alkoxide, water, and an alcohol.

6. The method of claim 5, wherein said silicon alkoxide is selected from the group consisting of tetraethylorthosilicate and tetramethylorthosilicate.

7. The method of claim 5, wherein said alcohol is selected from the group consisting of methanol, ethanol, butanol, and pentanol.

8. A method of fabricating a microwave electronic structure, said method comprising the sequential steps of:

(a) polymerizing a mixture comprising a silicon alkoxide, water and an alcohol to form a silica gel;

(b) sintering said gel at an elevated temperature sufficiently high to form a microporous or fully dense silica glass structure; and (c) coating said glass structure with an electrical conductor by coating the structure with a solution formed by dissolving an organic compound of a metal in an organic solvent selected from the group consisting of xylene, toluene, cyclohexane and dipentene and then volatizing the solvent.

9. The method of claim 8, wherein said gel is sintered at a temperature of about 800° C. to about 1025° C.

10. The method of claim 8, wherein the sintering temperature is reached by increasing the temperature of the gel of step (a) at a rate of about 0.5° C./minute to about 5.0° C./minute.

11. The method of claim 8, wherein said conductor is a metal selected from the group consisting of silver, gold, copper, and mixtures thereof.

12. The method of claim 11, wherein said organic solvent is selected from the group consisting of xylene, toluene, cyclohexane, and dipentene.

13. The method of claim 8, wherein said silicon alkoxide is selected from the group consisting of tetraethylorthosilicate and tetramethylorthosilicate.

14. The method of claim 8, wherein said alcohol is selected from the group consisting of methanol, ethanol, butanol, and pentanol.

* * * * *